United States Patent [19]
Hirt, Jr. et al.

[11] Patent Number: 4,737,414
[45] Date of Patent: Apr. 12, 1988

[54] MULTILAYER COMPOSITES COMPRISING POLYETHERIMIDE LAYERS ADJACENT TO POLYCARBONATE OR COPOLYESTER CARBONATE LAYERS

[75] Inventors: Robert P. Hirt, Jr., Lenox; James M. Mihalich, Windsor; Richard T. Rische, Cheshire, all of Mass.

[73] Assignee: General Electric Company, Mt. Vernon, Ind.

[21] Appl. No.: 652,512

[22] Filed: Sep. 20, 1984

[51] Int. Cl.$^4$ .................... B32B 27/36; C08L 77/00
[52] U.S. Cl. .................... 428/412; 428/473.5; 428/480; 525/425; 525/433
[58] Field of Search ............... 525/425, 433; 428/473.5, 412, 480

[56] References Cited

U.S. PATENT DOCUMENTS 4,141,927 2/1979 White et al. .................... 525/432
4,548,997 10/1985 Mellinger et al. ............... 525/433
4,576,842 3/1986 Hartsing ........................ 428/473.5

FOREIGN PATENT DOCUMENTS 0117326 9/1984 European Pat. Off. ............ 525/425

Primary Examiner—Wilbert J. Briggs, Sr.
Assistant Examiner—A. L. Carrillo
Attorney, Agent, or Firm—Martin B. Barancik

[57] ABSTRACT

A composition comprising a multilayer composite wherein a layer comprising an aromatic polyetherimide is adjacent to a layer comprising an aromatic polyester.

20 Claims, No Drawings

MULTILAYER COMPOSITES COMPRISING POLYETHERIMIDE LAYERS ADJACENT TO POLYCARBONATE OR COPOLYESTER CARBONATE LAYERS

BACKGROUND OF THE INVENTION

Multilayer compositions have been utilized for many years. The concept of a multilayer is that the positive properties of two or more differing materials are combined with the integrity of each material being essentially uncompromised. Although many of these multilayer compositions can be hypothesized on the basis of laminating a material possessing certain strong properties with a material having strong properties in other areas, certain practical considerations inhibit successful implementation of this theory. The two materials are in intimate contact at their interface. The compatibility of the two resins at this interface is not known until actually contacted at the high temperatures necessary to obtain adherence of the layers. Where incompatibility is significant—the two layers pull apart with little external stressing force—a tie layer that binds the two relatively incompatible layers is necessary. In general, polymers of significantly differing chemical structure are relatively incompatible and require a tie layer for many of the composition's applications.

It has now been discovered that certain polymers with significantly differing chemical structures can be adjacent to each other in a multilayer composition without the benefit of a tie layer. These multilayer compositions have the benefits of a rigid, high modulus, impact resisting first layer in combination with a high temperature resistance, high modulus at high temperature, solvent resistant, abrasion resistant and low coefficient of friction second layer. Although not necessary for many applications, a tie layer has also been found which significantly increases the adhesiveness of a specific composite.

SUMMARY OF THE INVENTION

In accordance with the invention there is a composition which comprises a layer of an aromatic polyether imide immediately adjacent to a layer of an aromatic polyester. No tie layer is necessary in order to achieve compatibility under the usual testing conditions. A further aspect of the invention is use of a tie layer interposed between a layer of aromatic polyetherimide and a layer substantially of aromatic polycarbonate wherein the tie layer is aromatic copolyestercarbonate. Such tie layer is necessary when the composite is substantially stressed.

Polyether imides of the families disclosed in Wirth, et al U.S. Pat. No. 3,787,364 and Takekoshi, U.S. Pat. No. 4,024,101, both patents incorporated by reference, are useful in this invention. Polymers of the formula below are particularly useful:

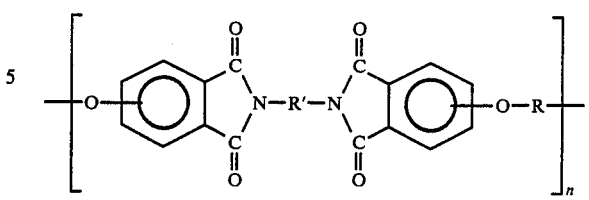

wherein R is a divalent aromatic radical containing from 6–20 carbon atoms, R' is a divalent radical which is the organic residue of a diamine reacted with a nitro-substituted aromatic anhydride and n is an integer having a value from about 10, for instance, from 2 to at least 5,000. More specifically, R can be a member selected from the group consisting of phenylene, lower alkylphenylene,

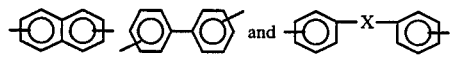

wherein X is a member selected from the group consisting of bivalent aliphatic of one to eight carbon atoms inclusive; cycloaliphatic of four to eight carbon atoms, inclusive; or araliphatic of seven to ten carbon atoms, inclusive;

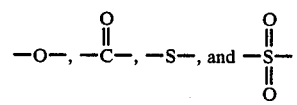

and R' is a member selected from the group consisting of R, xylylene, alkylene containing 2–20 carbon atoms, and cycloalkylene of four to eight carbon atoms, inclusive.

Of these compounds, the preferred ones are those wherein R' is a phenylene or alkyl substituted phenylene each alkyl of one to three carbon atoms, the number of alkyl substituents being one to three and R is

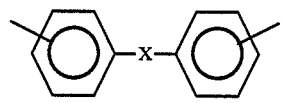

wherein X is a single bond, alkylene of two to eight carbon atoms, inclusive; alkylidene of one to eight carbon atoms, inclusive; cycloalkyl of four to eight carbon atoms, inclusive; cycloalkylidenyl of four to eight carbon atoms, inclusive;

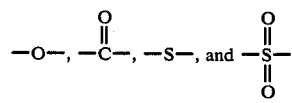

The preferred high polymer comprises repeating units of the structure

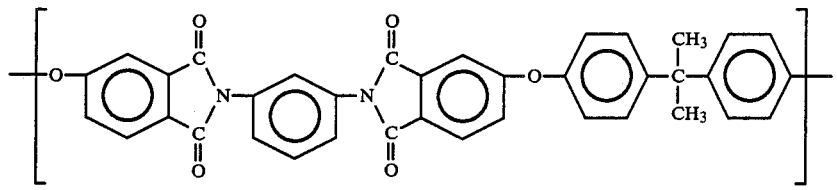

The organic portion of the specific diamino compound, R', which can be employed in the preparation of the aromatic polyetherimides are illustratively exemplified as the diamines at column 3, lines 10-47 of U.S. Pat. No. 3,787,364. The specific dihydric phenols which provide the phenylene portion, R, of the aromatic polyetherimide are illustratively exemplified at column 4, lines 8-56 of U.S. Pat. No. 3,787,364.

The number of carbon atoms maximum to be used in various alkylene, alkylidene, cycloalkyl, cycloalkylidene, etc. groups are eight carbon atoms, inclusive unless otherwise stated.

The aromatic polyester layer which is adjacent to the aromatic polyetherimide layer is a typical aromatic polyester such as a polyalkylene phthalate, aromatic polycarbonate, aromatic copolyestercarbonate, polyarylate and the like. Illustrative examples of a polyalkylene phthalate is a polyalkylene terephthalate wherein the alkylene grouping is from two to about ten carbon atoms, inclusive, the alkylene group being normal or branched. Preferred polyester of this subgroup are polyethylene terephthalate and polybutylene terephthalate, particularly the former. The aromatic polycarbonates useful in this invention are the typical polycarbonates useful in areas where high impact resistance resins are needed. The polycarbonates are prepared from a dihydric phenol and carbonate precursor under standard well known conditions such as interfacial polymerization. Typical dihydric phenols are those previously mentioned at column 4, lines 8-57 of U.S. Pat. No. 3,787,364. Bisphenol A is preferred. The aromatic copolyestercarbonates are those which are generally described in U.S. Pat. Nos. 4,465,820, and 4,464,512 each patent incorporated by reference into this application. A typical process of preparing aromatic copolyestercarbonate is as in U.S. Pat. No. 4,238,596 wherein dihydric phenol and aromatic ester precursor such as a phthalic acid dichloride are allowed to react followed by phosgenation. Generally the ester content of the copolyestercarbonate is from about 25 to 90 mole percent ester. When terephthalic acid and isophthalic acid residues are both present in the molecule, the percent terephthalic acid residue is from about 2 to about 90 percent, isophthalic acid residue from about 10 to 98 percent; preferably there should be at least about 50 mole percent isophthalic acid residue. More preferably the terephthalic acid residue is from about 2 to about 15 percent of the terephthalic and isophthalic acid residues. Polyarylates prepared from dihydric phenols such as those previously mentioned and phthalic acid or acid halides such as isophthalic and terephthalic acid or mixtures thereof are included within the polyarylates useful in this invention.

The films of each polymer should be of sufficient thickness to positively show the beneficial property(ies) of the polymer in the multilayer application to which it is applied. For example, wherein the aromatic polyetherimide layer is to be used in an application wherein food will be cooked on the layer, the film must be thick enough to render the object heat and modulus stable at the oven temperature. Solvent and abrasion resistance should also remain high if the application involves reusing a number of times after cleaning as opposed to a disposable application.

The aromatic polyester layer should be of a thickness sufficient to impart rigidity and modulus to the system of aromatic polyetherimide and aromatic polyester. For example a tray to be used for holding food which would then be cooked as in ordinary oven cookware and/or a microwave can be prepared from a layer of aromatic polyetherimide and aromatic polycarbonate, the food in contact with the aromatic polyetherimide layer. For this application it would be preferred that the article, the tray, have at least three layers, the aromatic polyetherimide providing both outside layers and the aromatic polyester being the internal layer in a sandwich type configuration. The edges of the tray configuration should also have an outer layer of aromatic polyetherimide. In this manner the high temperature resistant polyetherimide would be exposed to the high oven temperature while the aromatic polyester layer would maintain the rigidity and modulus of the tray. Even if the inner layer reached its softening point, the outer layer of greater temperature resistance would maintain the shape of the article.

The multilayers are prepared in the usual manner, that is by lamination of separate layers extruded in the normal fashion, or more typically by coextrusion through a diehead whereby the layers become intradielaminated. Coinjection molding can also be employed. After the multilayer composite is prepared, the final article can be prepared by such processes as cold-forming, thermoforming, blow molding and other like methods. The thickness of each of the layers can vary widely and depends upon the specific application of the multilayer composite. Generally layers of thickness 50 mils or less can be used for the outer layer(s). The inner layer, the aromatic polyester, can also vary in thickness, generally 100 mils or less being useable.

The tie layer is used when better adhesiveness of the composite multilayer is required than normally obtained when the aromatic polyetherimide is adjacent to a polycarbonate. It has been found that a copolyestercarbonate provides this adhesiveness. The thickness of the tie layer is not unduly significant and can be as thick or thicker than the aromatic polyetherimide. However it is not uncommon that the tie layer is significantly thinner than either of the layers which it ties. Thicknesses of the tie layer generally vary from about 0.5 to about 100 mils.

Although each of the layers are only mentioned in the singular, the aromatic polyetherimide and aromatic polyester can each be blended with other polymers so that the specific layer is a blend rather than merely a single polymer. The particular blended polymer is not significant as long as an intimate admixture is obtained and the desired properties of the layer remain essentially unchanged or are upgraded. Examples of such blending materials for aromatic polyetherimide include recycle scrap of the article having the polyetherimide and the aromatic polyester, aromatic polycarbonate and PET. Examples of blending materials for the aromatic polyester include acrylonitrile-butadienestyrene, recycle scrap of the article having the polyetherimide and the aromatic polyester and acrylic coreshell rubber. Generally, the aromatic polyetherimide and the aromatic polyester make up greater than 50 weight percent of their respective layers.

The aforesaid tie layer is an aromatic copolyestercarbonate. Generally, the copolyestercarbonate has from about 25 to about 90 mole percent ester bonds. However the copolyestercarbonate should have sufficient ester bonds so as to be an effective adhesive agent between the aromatic polyetherimide layer and and the aromatic polyester layer. It is preferred that the copolyestercarbonate be above 50 mole percent ester, more preferred above about 65 mole percent ester. With respect to the nature of the ester linkage, it is preferred that it be primarily isophthalate units rather than terephthalate units and more preferred that it be above about 70 percent isophthalate. The copolyestercarbonate need not be the sole polymeric component of the tie layer. The copolyestercarbonate can be blended with various other polymers up to the point where it still maintains its good positive adhesive interaction with the aromatic polyetherimide and aromatic polycarbonate layers. When combined with polycarbonate, blends with about 50 weight percent ester content and higher exhibit good adhesive properties between the two aforementioned layers.

Below are specific examples of the invention. These examples are intended to illustrate the invention and not limit the general inventive concept.

EXAMPLE 1

ULTEM ® 1000 resin, the preferred polyetherimide, which is shown schematically in the specification at page 4, lines 1–6, and having a melt flow rate of 9.0 g/10 minutes ±2 measured on an extrusion plastometer at 343.3° C., 6,600 gm mass measured according to ASTM procedure D1238 Method A and bisphenol-A polycarbonate having an Intrinsic Viscosity of 0.53 in methylene chloride at 25° C. were extruded in separate extruders at 730° F. and 530° F. respectively and combined in a feed-block adaptor to form a tri layer composite of polyetherimide, polycarbonate, polyetherimide having thicknesses in mils of 5/5/5, 6/10/6, 7/14/7 and 7/7/7. The composite was then vacuum formed at thermoforming temperature above 500° F. into a tray. Unless the coextrusion thermoforming is a continuous operation, it is preferred to dry the article prior to thermoforming.

In order to test the adhesiveness of the article, a razor blade was taken and the composite split and the layers pulled apart manually.

The trays were then tested by placing into a freezer overnight at −20° F., and then placing the tray empty, partially covered with frozen food or fully contacted with frozen food and heated at various temperatures, i.e. 425° F., and 450° F. and 490° F. At the lowest temperature, both the food and the tray with food contacting it survived the temperature well except that the food on the fully tray contacted was somewhat burnt. At the highest temperature the tray with food on it performed fair but the food on the fully tray contacted was burnt.

EXAMPLE 2

The same procedure for preparing the composite and the tray were performed as in Example 1 except that the polycarbonate is replaced with an aromatic copolyester-carbonate made from bisphenol-A, phosgene, isophthaloyl chloride and terephthaloyl chloride having 80 weight percent ester content of which 93 percent is isophthalate and 7% is terephthalate. The aromatic copolyester-carbonate was extruded at 610° F. The thickness of the trilayer composite layers were 5/9/5, 4/14.5/4, 3.5/14/4.5 and 4.5/14/4.

An attempt was made with a razor blade to pull apart the layers manually as in Example 1. The attempt failed. The aromatic copolyestercarbonate provided more adhesiveness than the polycarbonate.

The trays were heat tested as in Example 1 and performed in a similar manner except that they retained stability at a higher temperature.

N, the number of "mer" units in the aromatic polyether imide (n in formula on page 2) is preferably from about 10 to about 150.

What is claimed is:

1. A composition comprising a multilayer composite wherein a layer comprising an aromatic polyetherimide is adjacent to a layer comprising an aromatic polycarbonate or copolyestercarbonate.

2. The composition in accordance with claim 1 wherein the aromatic polyetherimide is of the formula

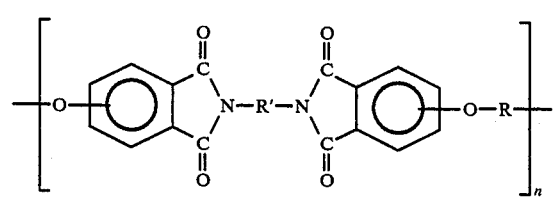

wherein R is a divalent aromatic radical containing from 6–20 carbon atoms, R' is a divalent radical which is the organic residue of a diamine reacted with a nitro-substituted aromatic anhydride and n is an integer having a range of from about 10 to about 5000.

3. The composition in accordance with claim 2 wherein R is a member selected from the group consisting of phenylene, lower alkylphenylene,

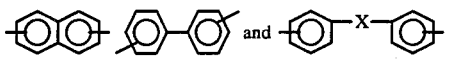

wherein X is a member selected from the group consisting of bivalent aliphatic radicals of one to eight carbon atoms, inclusive; cycloaliphatic radicals of four to eight carbon atoms inclusive; or araliphatic radicals of seven to ten carbon atoms, inclusive;

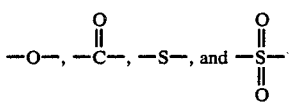

and R' is a member selected from the group consisting of R, xylylene, alkylene containing 2–20 carbon atoms, inclusive, and cycloalkylene of four to eight carbon atoms, inclusive.

4. The composition in accordance with claim 3 wherein the aromatic polyetherimide is

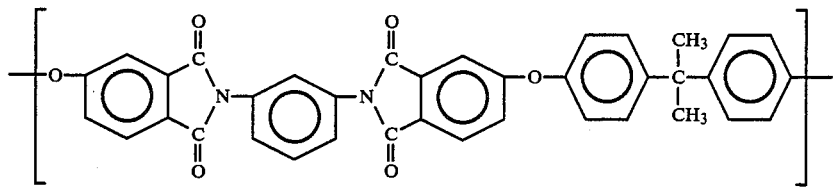

5. The composition in accordance with claim 4 wherein the layer is an aromatic polycarbonate derived from bisphenol-A.

6. The composition in accordance with claim 4 wherein the layer is an aromatic copolyestercarbonate having better than 50 mole percent ester bonds.

7. The composition in accordance with claim 6 wherein the ester bonds are more than about 50 percent isophthalate.

8. A composition in accordance with claim 1 wherein the second layer comprises a polycarbonate.

9. A composition in accordance with claim 1 wherein the second layer comprises a copolyestercarbonate.

10. A composition comprising a multilayer composite wherein a layer comprising an aromatic polyetherimide is adjacent to a layer comprising an aromatic polycarbonate or copolyestercarbonate, said composition in the shape of a tray.

11. The composition in accordance with claim 10 wherein the second layer comprises a polycarbonate.

12. The composition in accordance with claim 10 wherein the second layer comprises a copolyestercarbonate.

13. A process for preparing a multilayer composite which comprises coextruding a layer comprising a polyetherimide adjacent to a layer comprising an aromatic polycarbonate or copolyestercarbonate.

14. The process in accordance with claim 13 wherein the layer is copolyestercarbonate.

15. The process in accordance with claim 13 wherein the polyetherimide is of the formula

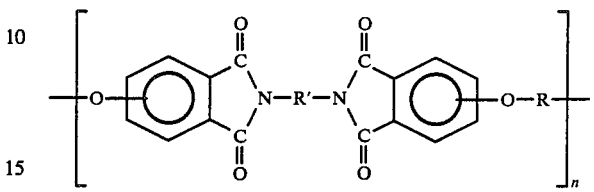

wherein n is an integer of about 10 to about 5,000, R is a member selected from the group consisting of phenylene, lower alkylphenylene,

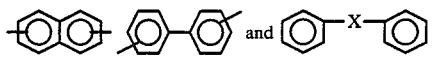

wherein X is a member selected from the group consisting of bivalent aliphatic radicals of one to eight carbon atoms, inclusive; cycloaliphatic radicals of four to eight carbon atoms inclusive; or araliphatic radicals of seven to ten carbon atoms, inclusive;

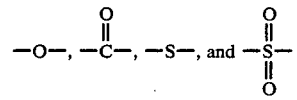

and R' is a member selected from the group consisting of R, xylylene, alkylene containing 2–20 carbon atoms, inclusive, and cycloalkylene of four to eight carbon atoms, inclusive.

16. The process in accordance with claim 13 wherein the layer is polycarbonate.

17. The process in accordance with claim 15 wherein R' is phenylene and R is the residue of bisphenol-A.

18. A composition comprising a multilayer composite wherein a layer comprising a polyetherimide is adjacent to a layer comprising an aromatic polycarbonate or an aromatic copolyestercarbonate which is adjacent to a layer comprising a polyetherimide.

19. The composition in accordance with claim 18 wherein the layer is an aromatic polycarbonate.

20. The composition in accordance with claim 18 wherein the layer is an aromatic copolyestercarbonate.

* * * * *